US012562493B2

(12) United States Patent
Kuo et al.

(10) Patent No.: US 12,562,493 B2
(45) Date of Patent: Feb. 24, 2026

(54) ANTENNA STRUCTURE AND ELECTRONIC DEVICE

(71) Applicant: Wistron NeWeb Corporation, Hsinchu (TW)

(72) Inventors: Ta Wei Kuo, Hsinchu (TW); I Yuan Lu, Hsinchu (TW); Yen Ming Hong, Hsinchu (TW)

(73) Assignee: WISTRON NEWEB CORPORATION, Hsinchu City (TW)

( * ) Notice: Subject to any disclaimer, the term of this patent is extended or adjusted under 35 U.S.C. 154(b) by 78 days.

(21) Appl. No.: 18/591,086

(22) Filed: Feb. 29, 2024

(65) Prior Publication Data

US 2024/0297441 A1 Sep. 5, 2024

Related U.S. Application Data

(60) Provisional application No. 63/488,208, filed on Mar. 3, 2023.

(30) Foreign Application Priority Data

Feb. 6, 2024 (TW) ................................ 113104759

(51) Int. Cl.
*H01Q 1/22* (2006.01)
*H01Q 13/10* (2006.01)
*H01Q 21/28* (2006.01)

(52) U.S. Cl.
CPC ............ *H01Q 13/10* (2013.01); *H01Q 21/28* (2013.01); *H01Q 1/2291* (2013.01)

(58) Field of Classification Search
CPC ...... H01Q 13/10; H01Q 21/28; H01Q 1/2291; H01Q 5/371
See application file for complete search history.

(56) References Cited

U.S. PATENT DOCUMENTS

| | | | | |
|---|---|---|---|---|
| 10,056,696 | B2 * | 8/2018 | Tseng | H01Q 1/48 |
| 10,542,130 | B1 * | 1/2020 | Lo | H04M 1/026 |
| 2018/0342809 | A1 * | 11/2018 | Wu | H01Q 13/10 |
| 2019/0123423 | A1 * | 4/2019 | Wu | H01Q 1/243 |
| 2021/0226318 | A1 * | 7/2021 | Chen | H01Q 1/243 |
| 2021/0359410 | A1 * | 11/2021 | Li | H01Q 1/246 |

FOREIGN PATENT DOCUMENTS

| | | |
|---|---|---|
| TW | 201906228 A | 2/2019 |
| TW | 202029569 A | 8/2020 |

* cited by examiner

*Primary Examiner* — Dameon E Levi
*Assistant Examiner* — Michael M Bouizza
(74) *Attorney, Agent, or Firm* — McClure, Qualey & Rodack, LLP

(57) ABSTRACT

An antenna structure is provided. The antenna structure includes a first metal element and a second metal element. The first metal element includes a first slot that extends along a first direction to form an elongated shape. The second metal element includes a first branch portion including a first open section and a part section. The first open section extends along the first direction to form an open end, and the part section extends along a second direction to form an open end. A projection of the part section and a projection of the first slot are partially overlapped when being observed along a third direction. The first direction, the second direction, and the third direction are perpendicular to one another.

18 Claims, 7 Drawing Sheets

ANTENNA STRUCTURE AND ELECTRONIC DEVICE

RELATED APPLICATIONS

This application claims the benefit of priority to U.S. Provisional Application Ser. No. 63/488,208, filed on Mar. 3, 2023, and Taiwan Application Serial Number 113104759, filed on Feb. 6, 2024. The entire contents of the above identified applications are incorporated herein by reference.

BACKGROUND

Technical Field

The present disclosure relates to an antenna structure and an electronic device, and more particularly, to an antenna structure and an electronic device with a slot.

Description of Related Art

With the development trend of today's communication systems and the pursuit of styling features for electronic devices to be light-weight, thin and with narrow bezel and metal body, not only the space for placing antenna structures is usually compressed, but also the metal environment in the electronic device must be utilized in the design of antenna structures that meet the requirements, especially when electronic devices must meet the characteristics of multiple communication systems, multiple antennas, and multiple frequency bands. Therefore, the design of antenna structures in electronic devices faces severe challenges.

In view of this, there is an urgent need in today's antenna structure and electronic device market to develop an antenna structure and an electronic device that are small in size, operate in wideband and multi-bands, and meet the antenna installation requirement.

SUMMARY

In one aspect, the present disclosure provides an antenna structure that includes a first metal element and a second metal element. The first metal element includes a first slot which extends along a first direction to form an elongated shape. The second metal element includes a first branch portion including a first open section and a part section. The first open section extends along the first direction to form an open end. The part section extends along a second direction to form an open end. A projection of the part section and a projection of the first slot are partially overlapped when being observed along a third direction. The first direction, the second direction, and the third direction are perpendicular to one another.

In another aspect, the present disclosure provides an electronic device that includes a housing and the aforementioned antenna structure. The first metal element of the aforementioned antenna structure is a part of the housing.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
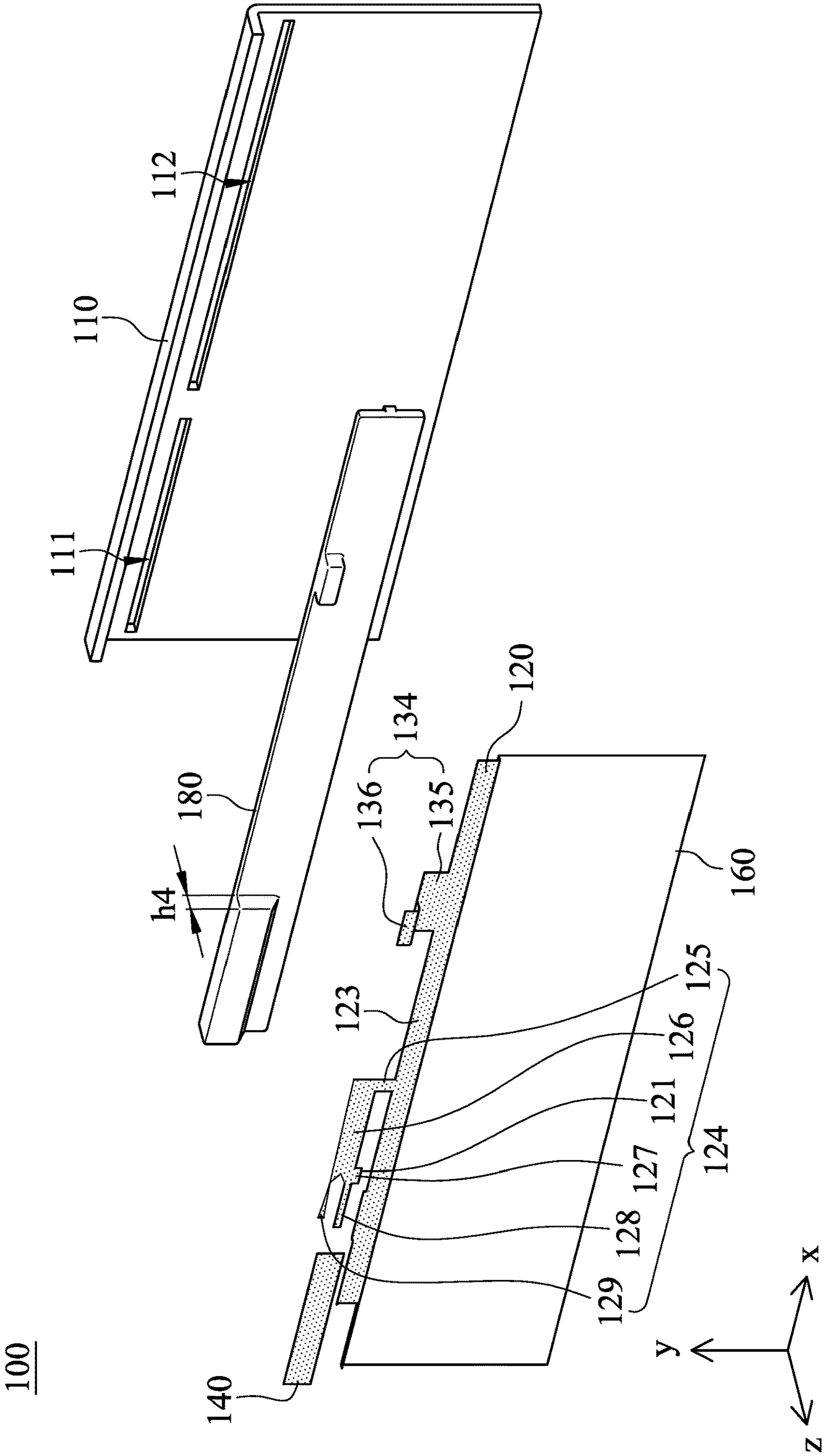
FIG. 1 is an exploded view of an antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
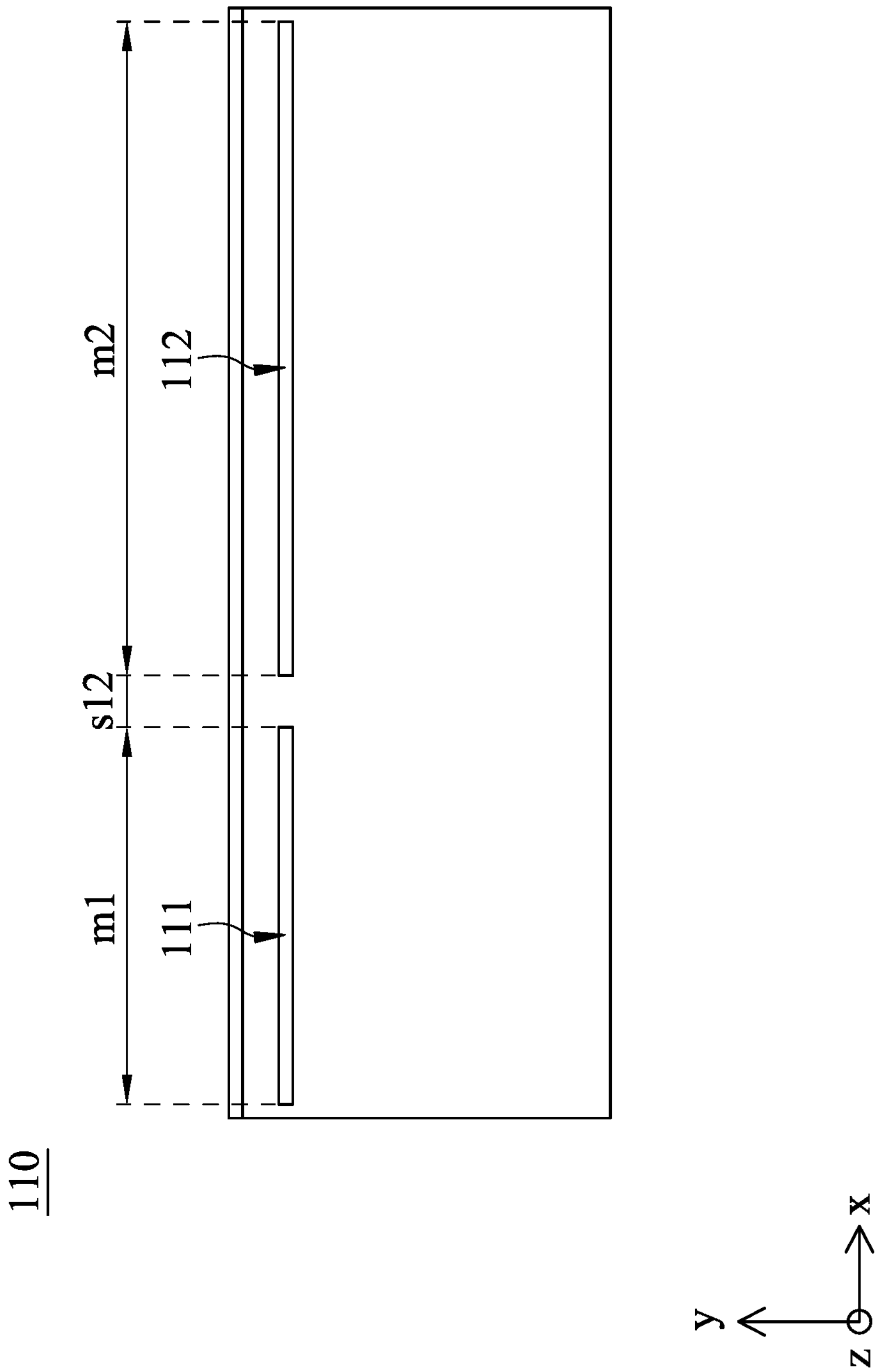
FIG. 2 is a front view of a first metal element of the antenna structure according to the first embodiment.
Figure 3:
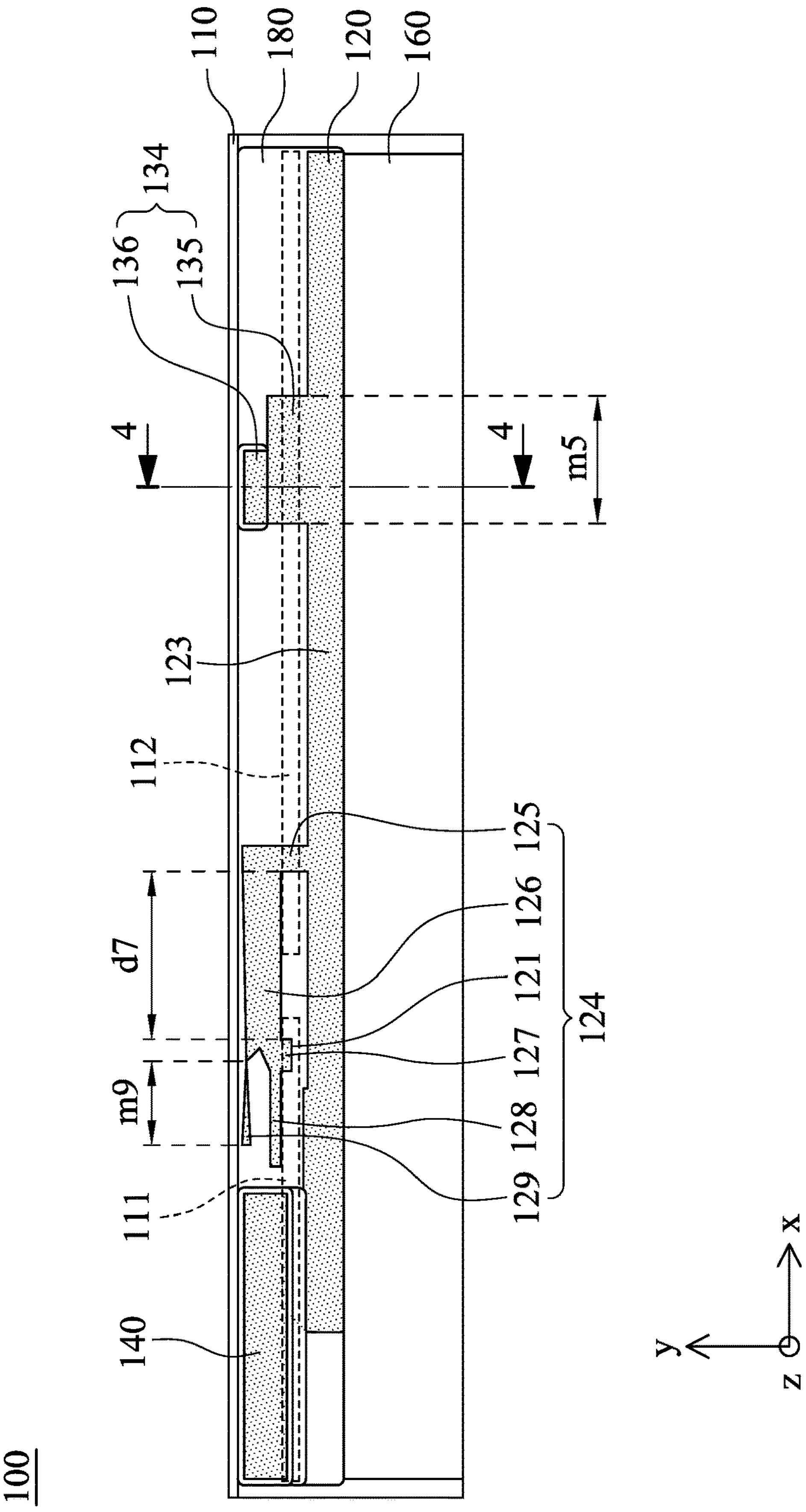
FIG. 3 is a front view of the antenna structure according to the first embodiment.

FIG. 1 is an exploded view of an antenna structure 100 according to a first embodiment of the present disclosure, FIG. 2 is a front view of a first metal element 110 of the antenna structure 100 according to the first embodiment, and FIG. 3 is a front view of the antenna structure 100 according to the first embodiment. Referring to FIG. 1 to FIG. 3, the antenna structure 100 includes the first metal element 110, a second metal element 120, and a dielectric element 180. The first metal element 110 has a sheet-like shape or a shell-like shape and includes a first slot 111 formed thereon, and the first slot 111 extends along a first direction x to form an elongated shape.

The second metal element 120 is sheet-like and includes a first branch portion 124 including a first open section 128 and a part section 127 (a perpendicular section, specifically). The first open section 128 extends along the first direction x to form an open end. The part section 127 extends along a second direction y to form an open end. The projection of the part section 127 and the projection of the first slot 111 are partially overlapped when being observed along a third direction z (as shown in FIG. 3). The first direction x, the second direction y, and the third direction z are perpendicular to one another. Moreover, the dielectric element 180 is connected between the first metal element 110 and the second metal element 120 and can be made of a plastic material, but the present disclosure is not limited thereby. Hence, the second metal element 120 together with the first metaling element 110 with the first slot 111 composes a slot antenna having wideband and/or multi-bands.

In specific, the part section 127 can be configured for disposing a feed point 121, and the projection of the feed point 121 and the projection of the first slot 111 are at least partially overlapped when being observed along the third direction z (as shown in FIG. 3). Therefore, the antenna structure 100 featured with single-feeding excites an operating band corresponding to the first slot 111.

The antenna structure 100 can further include a grounding element 160. The second metal element 120 can further include a main portion 123 that extends along the first direction x. A side of the main portion 123 in the second direction y is electrically connected to the grounding element 160. As such, the radio frequency characteristics of the antenna structure 100 are maintained while the antenna structure 100 is integrated inside the electronic device. Further, the grounding element 160 can substantially be a copper foil, and the first metal element 110 can also be directly or indirectly electrically connected to the grounding element 160.

The first metal element 110 can further include a second slot 112 formed thereon. The second slot 112 extends along the first direction x to form an elongated shape. The first slot 111 and the second slot 112 are arranged and aligned along the first direction x, and there is a gap s12 between the first slot 111 and the second slot 112. The length m1 of the first slot 111 and the length m2 of the second slot 112 are different. As such, the volume and area of the antenna structure 100 can be reduced while achieving multi-band applications (for example, including Wi-Fi 6E band). Specifically, the width of the first slot 111 and the width of the second slot 112 are both 1 mm.

The length m1 of the first slot 111 can be less than the length m2 of the second slot 112. As such, the antenna structure 100 featured with single-feeding excites two different operating bands corresponding to the first slot 111 and the second slot 112, respectively. In addition, the coupling effect of the antenna structure 100 itself excites a third operating band to increase the bandwidth of the antenna structure 100. It is noted that in the present disclosure, the term “connect” refers to physical connection between two elements and can be direct connection or indirect connection, and the term “couple” refers to electric field energy excitation between two elements that are separate from each other and not physically connected, in which the electric field energy excitation means the electric field energy generated by the current of one of the two elements excites the electric field energy of the other element.

The ratio of the length m2 of the second slot 112 to the length m1 of the first slot 111 can be between 1.2 and 5. As such, the antenna structure 100 can be designed to include two operating bands within a limited space. More particularly, the length m2 of the second slot 112 is 38 mm, the length m1 of the first slot 111 is 22 mm, and the aforementioned ratio is 1.73.

The first slot 111 is configured to provide the first operating frequency for the antenna structure 100, and the first operating frequency can be between 5.15 GHz and 5.47 GHz. The second slot 112 is configured to provide the second operating frequency for the antenna structure 100, and the second operating frequency can be between 2.4 GHz and 2.5 GHz. The gap s12 can be between 1 mm and 4 mm, and the sum of the length m1 of the first slot 111, the gap s12, and the length m2 of the second slot 112 can be between 58 mm and 68 mm. As such, the antenna structure 100 is a single-feeding antenna in close contact with a metal environment slot for exciting Wi-Fi 2G and 5G bands through the slot length of the ½-resonant-wavelength and for exciting Wi-Fi 6E band through the coupling or parasitic effect of the antenna structure 100 itself to improve the issue of insufficient bandwidth. In particular, the length m1 of the first slot 111 is 22 mm, the gap s12 is 3 mm, the length m2 of the second slot 112 is 38 mm, and the sum is 63 mm.

The first branch portion 124 of the second metal element 120 can further include a connecting section 125 and a body section 126. The other side of the main portion 123 in the second direction y is connected to the connecting section 125, and the connecting section 125 extends along the second direction y and is connected to the body section 126. The body section 126 extends along the first direction x and is connected to the first open section 128 and the part section 127. Thus, the frequency band excited by the first slot 111 can be adjusted through the connecting section 125, the body section 126, the part section 127, and the first open section 128.

The first branch portion 124 can further include the second open section 129. The body section 126 extends along the first direction x and is connected to the second open section 129. The second open section 129 extends along the first direction x to form an open end, and the first open section 128 and the second open section 129 are arranged along the second direction y. The first open section 128 can be located closer to the part section 127 than the second open section 129. The second open section 129 tapers from the open end thereof toward the body section 126, and the position at which the second open section 129 and the body section 126 are connected has a width that satisfies structural strength and manufacturing yield. Furthermore, the part section 127 can protrude toward the main portion 123 along the second direction y. Hence, the frequency band of the first slot 111 can be adjusted through the second open section 129 and the part section 127.

The ratio of the length m1 of the first slot 111 to the length m9 of the second open section 129 along the first direction x can be between 3 and 10. The ratio of the length m1 of the first slot 111 to the distance d7 from the connecting section 125 to the part section 127 along the first direction x can be between 2 and 6. As such, the frequency band range of the first slot 111 can be adjusted within a small space. Particularly, the ratio of the length m1 (22 mm) of the first slot 111 to the length m9 (4 mm) of the second open section 129 along the first direction x is 5.5, and the ratio of the length m1 (22 mm) of the first slot 111 to the distance d7 (7.9 mm) from the connecting section 125 to the part section 127 along the first direction x is 2.78.

The projection of the connecting section 125 and the projection of the second slot 112 can be partially overlapped when being observed along the third direction z, as shown in FIG. 3. Hence, the antenna structure 100 itself is able to excite the third frequency band, thereby increasing the bandwidth of the antenna structure 100.

The second metal element 120 can further include a second branch portion 134. The other side of the main portion 123 in the second direction y is connected to the second branch portion 134. The second branch portion 134 extends along the second direction y and forms a stepped shape toward the third direction z, and the projection of the second branch portion 134 and the projection of the second slot 112 are partially overlapped when being observed along the third direction z, as shown in FIG. 3. Hence, the frequency band excited by the second slot 112 can be adjusted through the second branch portion 134.

Figure 4:
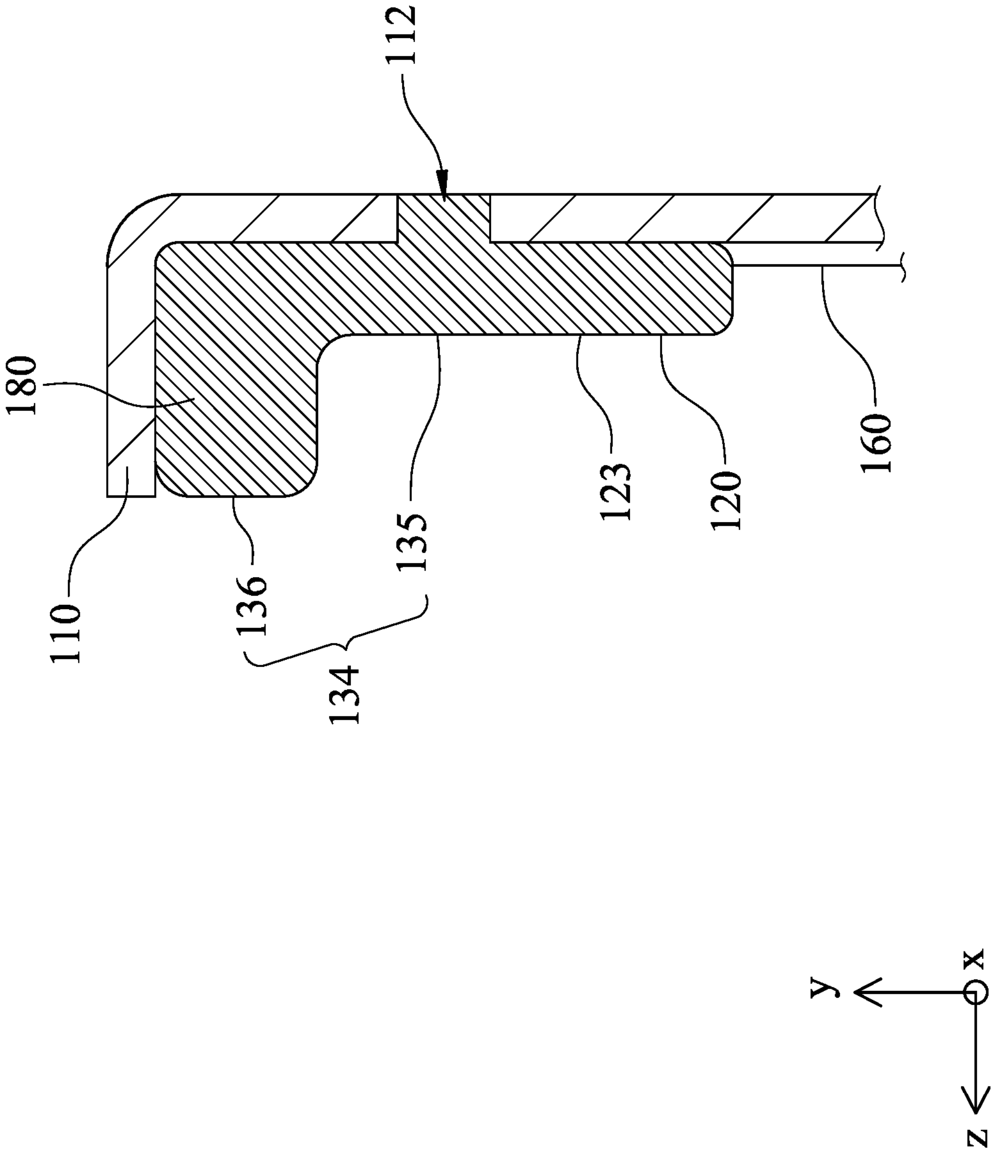
FIG. 4 is a cross-sectional view taken along line 4-4 of FIG. 3.

FIG. 4 is a cross-sectional view taken along line 4-4 of FIG. 3. Referring to FIG. 1, FIG. 3, and FIG. 4, the second branch portion 134 can include a first stepped surface 135 and a second stepped surface 136, and a normal direction of each of the first stepped surface 135 and the second stepped surface 136 is parallel to the third direction z. The main portion 123, the first stepped surface 135, and the second stepped surface 136 are electrically connected in sequence (as shown in FIG. 1 and FIG. 4), and the projection of the first stepped surface 135 and the projection of the second slot 112 are partially overlapped (as shown in FIG. 3). The length m5 of the first stepped surface 135 along the first direction x is greater than the length of the second stepped surface 136 along the first direction x. This allows for both operating frequency adjustment and design flexibility.

Referring to FIG. 2 and FIG. 3, the ratio of the length m2 of the second slot 112 to the length m5 of the first stepped surface 135 along the first direction x can be between 4 and 10. This helps to adjust the frequency band excited by the second slot 112 while also taking into account miniaturization. In specific, the length m2 of the second slot 112 is 38 mm, the length m5 of the first stepped surface 135 along the first direction x is 6 mm, and the aforementioned ratio is 6.33.

Referring to FIG. 1 and FIG. 3, the antenna structure 100 can further include a third metal element 140. The third metal element 140 is sheet-like and disposed adjacent to and separated from the open end of the first open section 128 and the open end of the second open section 129. There is a distance between the first open section 128 and the third metal element 140 along the third direction z (the distance is about the height h4 of the protrusion of the dielectric element 180 in FIG. 1). The projection of the third metal element 140 and the projection of the first slot 111 are partially overlapped when being observed along the third direction z (as shown in FIG. 3). Hence, the frequency band excited by the first slot 111 can be adjusted through the third metal element 140. In the first embodiment, in the third direction z, the main portion 123, the first branch portion 124, and the first stepped surface 135 are all located at the first plane height, and the third metal element 140 and the second stepped surface 136 are both located at the second plane height. When the plane height of the first slot 111 and the second slot 112 is the reference plane height, the second plane height is greater than the first plane height.

The second metal element 120 and the third metal element 140 can be disposed along the surface of the dielectric element 180 and formed by a laser direct structuring (LDS) method. The dielectric element 180 can be made of a plastic material and extends into the first slot 111 and the second slot 112. Hence, with the combination of the dual-slot environment of the first metal element 110 and the LDS antenna of the second metal element 120, a multi-band slot antenna with a smaller volume than an antenna structure designed on a circuit board is provided.

Figure 5:
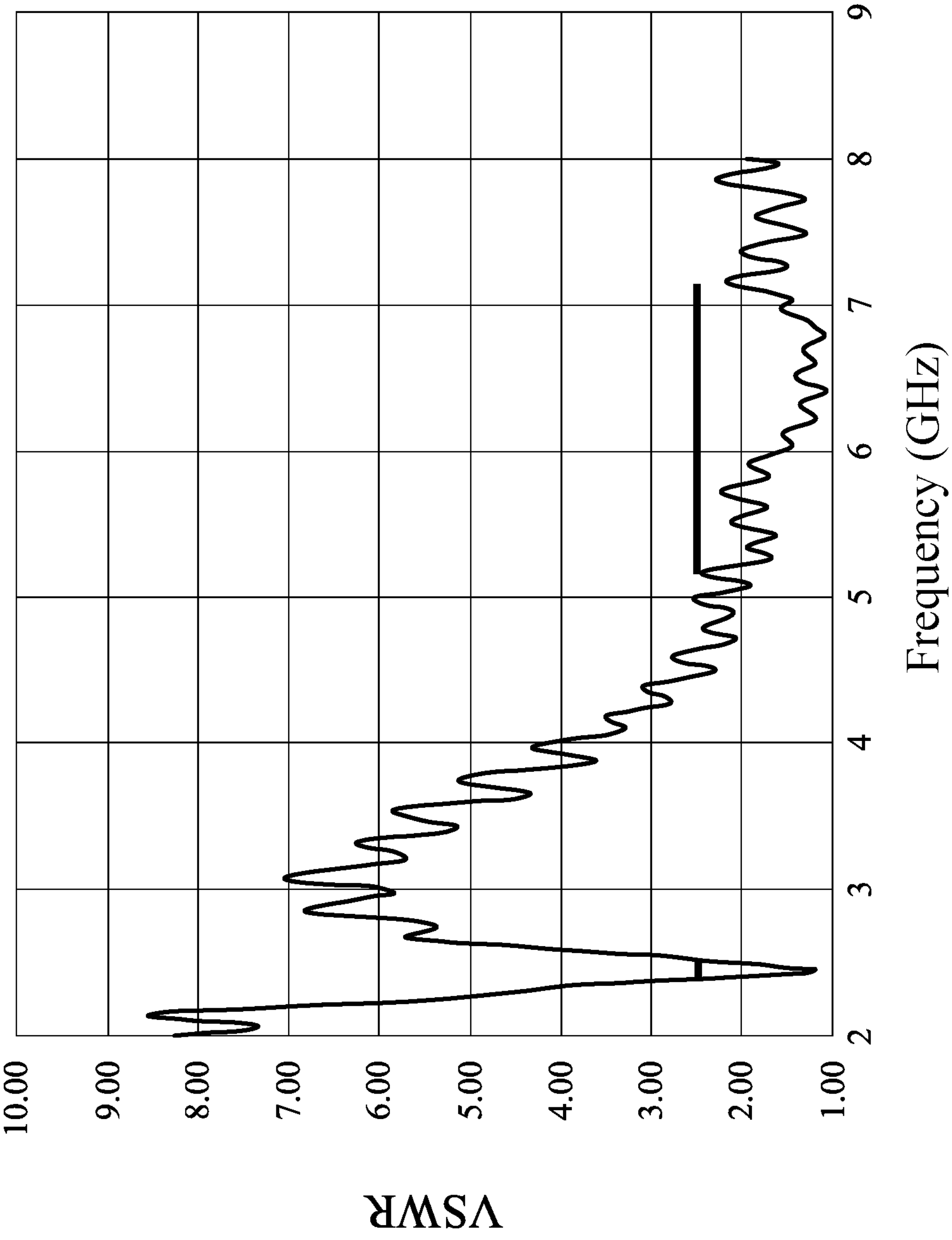
FIG. 5 is a schematic diagram illustrating VSWR of the antenna structure shown in FIG. 3.
Figure 6:
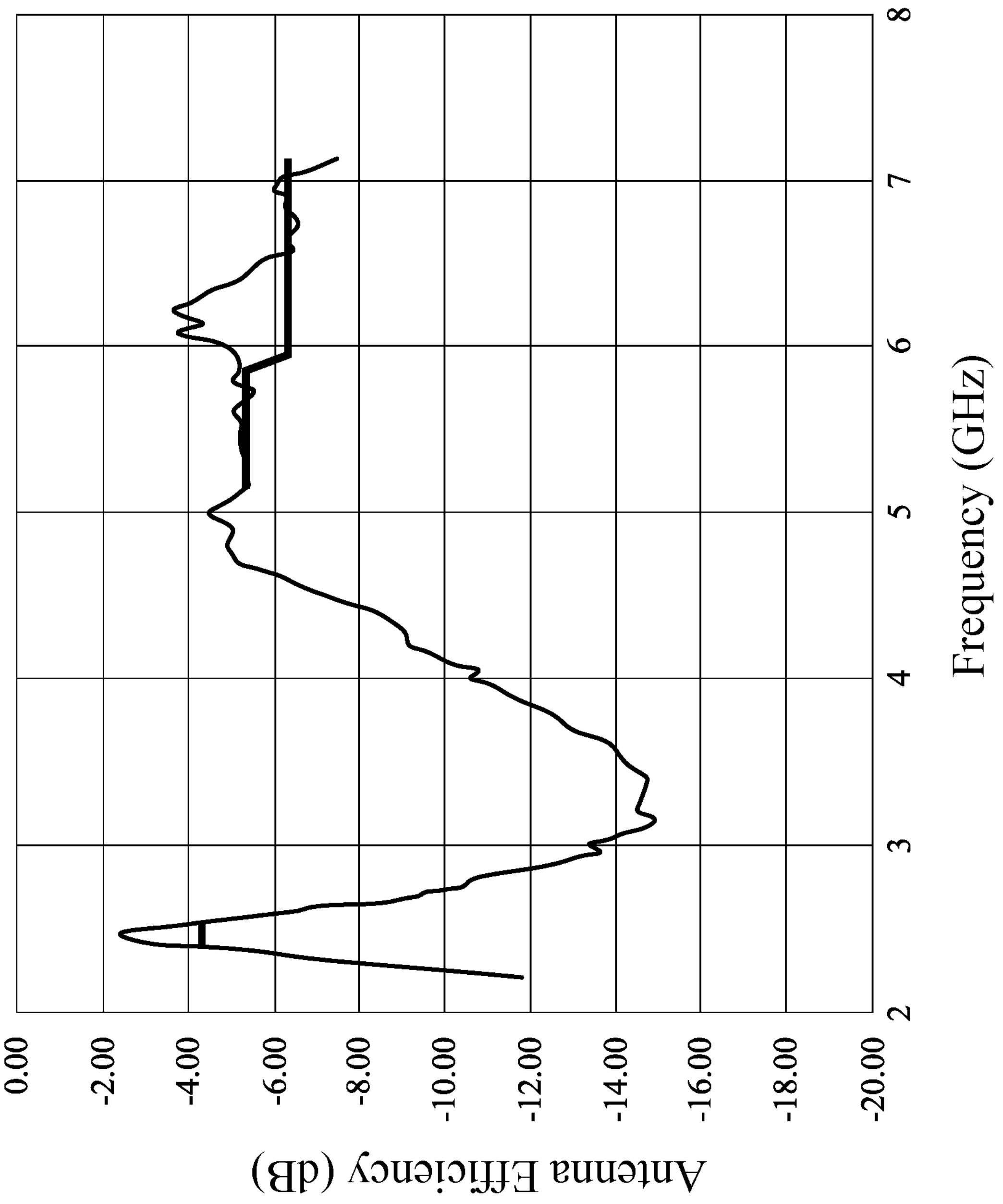
FIG. 6 is a schematic diagram illustrating antenna efficiency of the antenna structure shown in FIG. 3.

FIG. 5 is a schematic diagram illustrating the voltage standing wave ratio (VSWR) of the antenna structure 100 shown in FIG. 3, and FIG. 6 is a schematic diagram illustrating antenna efficiency of the antenna structure 100 shown in FIG. 3. Referring to FIG. 5 and FIG. 6, through the relative positions between the antenna pattern of the antenna structure 100 (the second metal element 120 and the third metal element 140) and the dual slots (the first slot 111 and the second slot 112), the VSWR characteristics are as shown in FIG. 5, which have a low operating frequency bandwidth around 2.5 GHz (VSWR value less than 2.5), and by using multiple parasitic coupling components, like the part section 127, the first open section 128, the second open section 129, and the third metal element 140, the high operating frequency bandwidth ranges from 5 GHz to 7 GHz (for example, covering from 5.925 GHz to 7.125 GHz), thereby designing the antenna structure 100 with three operating bands (Wi-Fi 2G, 5G and 6E). Further, the antenna efficiency of the antenna structure 100 is increased 20% to 30% with this design, as shown in FIG. 6. In addition, the antenna structure 100 according to the present disclosure is also conducive to assembly consistency, that is, it improves antenna characteristics and antenna efficiency while also having good production stability.

Figure 7:
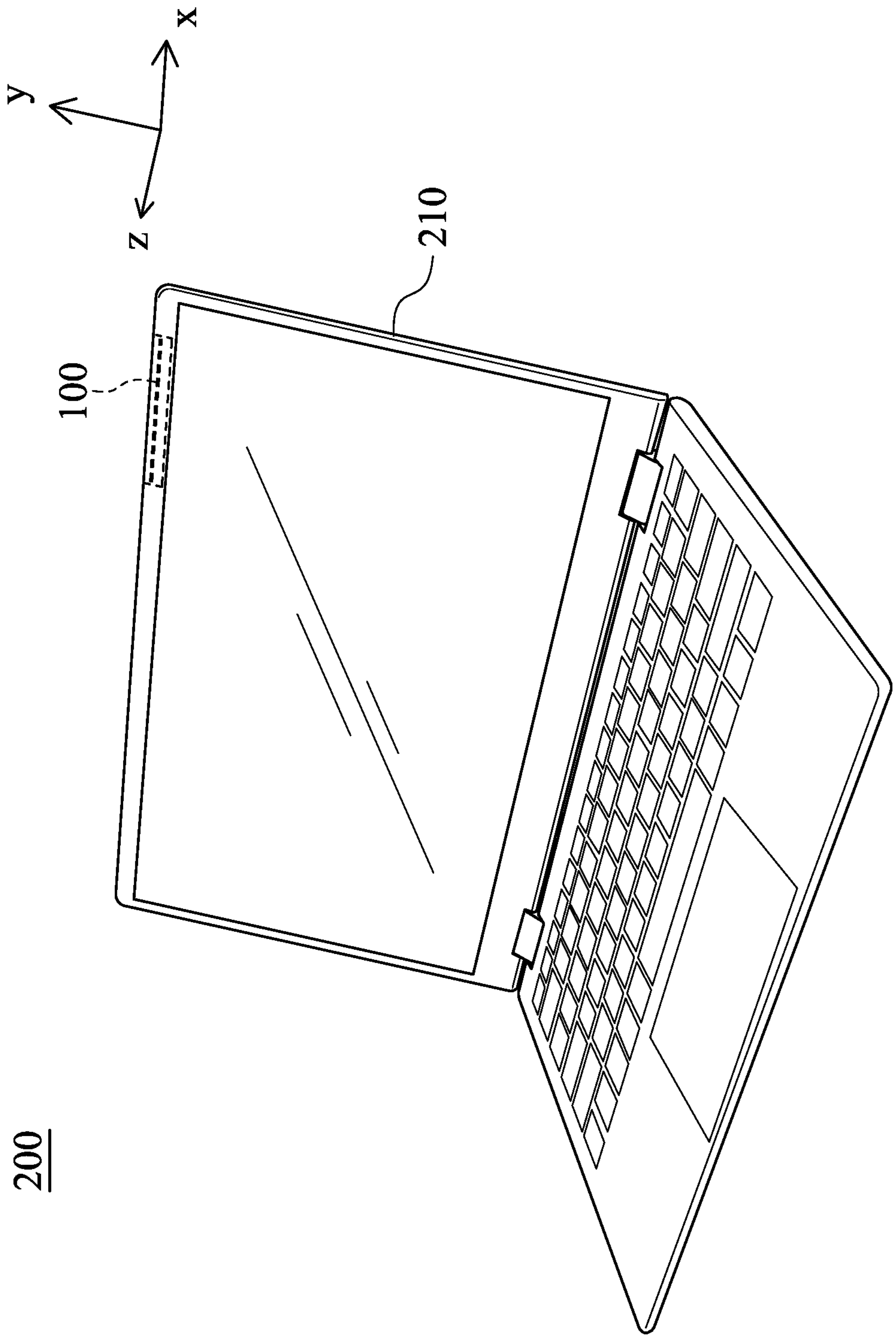
FIG. 7 is a schematic view of an electronic device according to a second embodiment of the present disclosure.

FIG. 7 is a schematic view of an electronic device 200 according to a second embodiment of the present disclosure. Referring to FIG. 2, FIG. 3, and FIG. 7, the electronic device 200 includes a housing 210 and the aforementioned antenna structure 100 of the first embodiment, and the first metal element 110 is a part of the housing 210. Hence, the antenna structure 100 not only has a smaller volume compared to the antenna structure designed on the circuit board, but also can utilize just the dual-slot environment (the first slot 111 and the second slot 112) on the electronic device 200 to achieve at least three communicative frequency bands, rather than requiring the use of at least three slots, thus helping to achieve further miniaturization of the antenna structure 100 and further meeting the space configuration requirements in the electronic device 200. Particularly, the electronic device 200 can be a notebook computer, the antenna structure 100 is disposed in the bezel of the screen of the electronic device 200, the first metal element 110 is the part of the housing 210 located at the backside of the screen and includes the first slot 111 and the second slot 112 (as shown in FIG. 2), and the second metal element 120 and the third metal element 140 are located closer to the bezel of the screen than the first metal element 110 is located to the bezel of the screen, but the present disclosure is not limited thereby.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a first metal element comprising a first slot, wherein the first slot extends along a first direction to form an elongated shape;

a second metal element comprising a first branch portion, wherein the first branch portion comprises a first open section and a part section, the first open section extends along the first direction to form an open end, the part section extends along a second direction to form an open end, and a projection of the part section and a projection of the first slot are partially overlapped when being observed along a third direction, wherein the first direction, the second direction, and the third direction are perpendicular to one another; and a grounding element;

wherein the second metal element further comprises a main portion extending along the first direction, and a side of the main portion in the second direction is electrically connected to the grounding element;

wherein the first branch portion further comprises a connecting section and a body section, the other side of the main portion in the second direction is connected to the connecting section, the connecting section extends along the second direction and is connected to the body section, and the body section extends along the first direction and is connected to the first open section and the part section.

2. The antenna structure according to claim 1, wherein the part section is configured for disposing a feed point.

3. The antenna structure according to claim 1, wherein the first metal element further comprises a second slot extending along the first direction to form an elongated shape, the first slot and the second slot are arranged and aligned along the first direction, a gap is formed between first slot and the second slot, and a length of the first slot and a length of the second slot are different.

4. The antenna structure according to claim 3, wherein the length of the first slot is less than the length of the second slot.

5. The antenna structure according to claim 4, wherein a ratio of the length of the second slot to the length of the first slot is between 1.2 and 5.

6. The antenna structure according to claim 3, wherein the first slot is configured to provide an operating frequency between 5.15 GHz and 5.47 GHz, and the second slot is configured to provide an operating frequency between 2.4 GHz and 2.5 GHz.

7. The antenna structure according to claim 3, wherein the first branch portion further comprises a second open section, the body section extends along the first direction and is connected to the second open section, the second open section extends along the first direction to form an open end, and the first open section and the second open section are arranged along the second direction.

8. The antenna structure according to claim 7, wherein the first open section is located closer to the part section than the second open section, and the second open section tapers from the open end thereof toward the body section.

9. The antenna structure according to claim 7, wherein a ratio of the length of the first slot to a length of the second open section along the first direction is between 3 and 10, and a ratio of the length of the first slot to a distance from the connecting section to the part section along the first direction is between 2 and 6.

10. The antenna structure according to claim 3, wherein a projection of the connecting section and a projection of the second slot are partially overlapped when being observed along the third direction.

11. The antenna structure according to claim 3, wherein the gap is between 1 mm and 4 mm, and a sum of the length of the first slot, the gap, and the length of the second slot is between 58 mm and 68 mm.

12. The antenna structure according to claim 3, wherein the second metal element further comprises a second branch portion, the other side of the main portion in the second direction is connected to the second branch portion, the second branch portion extends along the second direction, and a projection of the second branch portion and a projection of the second slot are partially overlapped when being observed along the third direction.

13. The antenna structure according to claim 12, wherein the second branch portion forms a stepped shape toward the third direction and comprises a first stepped surface and a second stepped surface, a normal direction of each of the first stepped surface and the second stepped surface is parallel to the third direction, the main portion, the first stepped surface, and the second stepped surface are electrically connected in sequence, a projection of the first stepped surface and the projection of the second slot are partially overlapped, and a length of the first stepped surface along the first direction is greater than a length of the second stepped surface along the first direction.

14. The antenna structure according to claim 13, wherein a ratio of the length of the second slot to the length of the first stepped surface along the first direction is between 4 and 10.

15. The antenna structure according to claim 1, wherein the part section protrudes toward the main portion along the second direction.

16. The antenna structure according to claim 1, further comprising:

a dielectric element connected between the first metal element and the second metal element, wherein the second metal element is disposed along a surface of the dielectric element and formed by a laser direct structuring (LDS) method, and the dielectric element extends into the first slot.

17. An electronic device, comprising:

a housing; and the antenna structure as described in claim 1, wherein the first metal element is a part of the housing.

18. An antenna structure, comprising:

a first metal element comprising a first slot, wherein the first slot extends along a first direction to form an elongated shape;

a second metal element comprising a first branch portion, wherein the first branch portion comprises a first open section and a part section, the first open section extends along the first direction to form an open end, the part section extends along a second direction to form an open end, and a projection of the part section and a projection of the first slot are partially overlapped when being observed along a third direction, wherein the first direction, the second direction, and the third direction are perpendicular to one another; and a third metal element adjacent to and separated from the open end of the first open section, wherein there is a distance between the first open section and the third metal element along the third direction, and a projection of the third metal element and a projection of the first slot are partially overlapped when being observed along the third direction.

* * * * *